(12) United States Patent
Glugla et al.

(10) Patent No.: US 9,534,984 B2
(45) Date of Patent: Jan. 3, 2017

(54) SPARK PLUG FOULING DETECTION FOR IGNITION SYSTEM

(71) Applicant: Ford Global Technologies, LLC, Dearborn, MI (US)

(72) Inventors: Chris Paul Glugla, Macomb, MI (US); Garlan J. Huberts, Milford, MI (US); Qiuping Qu, Troy, MI (US); Nelson William Morrow, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 14/535,157

(22) Filed: Nov. 6, 2014

(65) Prior Publication Data

US 2015/0176508 A1   Jun. 25, 2015

Related U.S. Application Data

(60) Provisional application No. 61/918,585, filed on Dec. 19, 2013.

(51) Int. Cl.
| | | |
|---|---|---|
| F02P 17/12 | (2006.01) | |
| F02P 11/06 | (2006.01) | |

(Continued)

(52) U.S. Cl.
CPC ............ G01M 15/042 (2013.01); F02D 41/30 (2013.01); F02P 11/06 (2013.01); F02P 17/12 (2013.01);

(Continued)

(58) Field of Classification Search
CPC .......... F02D 17/02; F02D 37/02; F02D 35/02; F02D 35/027; F02D 35/0015; F02D 35/021; F02D 41/30; F02D 41/1495; F02D 41/008; F02D 41/221;F02D 41/22; F02D 2041/228; F02P 17/12; F02P 17/00; F02P 17/02; F02P 17/10; F02P 11/06; F02P 11/02

(Continued)

(56) References Cited

U.S. PATENT DOCUMENTS

| | | | | |
|---|---|---|---|---|
| 3,581,141 A | * | 5/1971 | Beaubier | H01T 13/52 313/130 |
| 5,490,489 A | * | 2/1996 | Mayer | F02P 17/12 123/630 |

(Continued)

FOREIGN PATENT DOCUMENTS

WO    2013115712 A1    8/2013

OTHER PUBLICATIONS

Huberts, Garlan J. et al., "Spark Plug Fouling Detection for Ignition System," U.S. Appl. No. 14/077,064, filed Nov. 11, 2013, 31 pages.

(Continued)

*Primary Examiner* — Lindsay Low
*Assistant Examiner* — George Jin
(74) *Attorney, Agent, or Firm* — Julia Voutyras; Alleman Hall McCoy Russell & Tuttle LLP

(57) ABSTRACT

Methods and systems are provided for inferring spark plug fouling due to accumulation of fuel additives thereon. In one example, an engine controller may infer spark plug fouling due to accumulation of fuel additive based on a combination of engine operating parameters correlated with spark plug health. For example, the engine operating parameters may include a change in an adaptive knock term, an engine pre-ignition rate, and engine exhaust oxygen sensor switching frequency over a vehicle drive cycle, and an engine misfire rate.

19 Claims, 3 Drawing Sheets

(51) Int. Cl.
*G01M 15/04* (2006.01)
*F02D 41/30* (2006.01)
*F02B 29/04* (2006.01)
*F02D 13/02* (2006.01)
*F02D 41/14* (2006.01)
*F02P 5/152* (2006.01)

(52) U.S. Cl.
CPC ........ *F02B 29/0406* (2013.01); *F02D 13/0265* (2013.01); *F02D 41/1495* (2013.01); *F02D 2200/1015* (2013.01); *F02P 5/152* (2013.01)

(58) Field of Classification Search
USPC ............ 123/406.11, 434; 73/114.02, 114.08, 73/114.62, 114.73, 114.75
See application file for complete search history.

(56) References Cited

U.S. PATENT DOCUMENTS

| | | | |
|---|---|---|---|
| 5,523,691 A * | 6/1996 | Frus | F02C 7/266 324/384 |
| 5,777,216 A | 7/1998 | Van Duyne et al. | |
| 6,512,375 B1 * | 1/2003 | Yamada | F02P 17/12 324/384 |
| 6,998,846 B2 | 2/2006 | Daniels et al. | |
| 7,673,614 B2 | 3/2010 | Inada et al. | |
| 8,132,556 B2 | 3/2012 | Glugla et al. | |
| 8,397,695 B2 | 3/2013 | Glugla et al. | |
| 8,683,976 B2 | 4/2014 | Cunningham et al. | |
| 2004/0084018 A1* | 5/2004 | Zhu | F01N 3/2006 123/406.14 |
| 2005/0114012 A1* | 5/2005 | Zhu | F02D 41/22 701/114 |
| 2007/0215130 A1* | 9/2007 | Shelby | F02D 19/084 123/637 |
| 2009/0241520 A1 | 10/2009 | Gendron et al. | |
| 2010/0057324 A1* | 3/2010 | Glugla | F02D 35/021 701/102 |
| 2011/0202260 A1* | 8/2011 | Cunningham | F02D 35/02 701/104 |
| 2012/0150415 A1 | 6/2012 | Glugla et al. | |
| 2013/0139786 A1* | 6/2013 | Glugla | F02D 41/0087 123/321 |
| 2013/0206106 A1* | 8/2013 | Huberts | F02B 77/08 123/406.27 |
| 2015/0112573 A1* | 4/2015 | Huberts | F02P 17/12 701/102 |
| 2015/0176558 A1* | 6/2015 | Glugla | F02P 17/12 123/294 |

OTHER PUBLICATIONS

Glugla, Chris P. et al., "Method and System for Pre-Ignition Control," U.S. Appl. No. 14/510,996, filed Oct. 9, 2014, 48 pages.

Glugla, Chris P. et al., "Spark Plug Fouling Detection for Ignition System," U.S. Appl. No. 14/535,174, filed Nov. 6, 2014, 57 pages.

* cited by examiner

SPARK PLUG FOULING DETECTION FOR IGNITION SYSTEM

CROSS REFERENCE TO RELATED APPLICATIONS

The present application claims priority to U.S. Provisional Patent Application No. 61/918,585, "SPARK PLUG FOULING DETECTION FOR IGNITION SYSTEM," filed on Dec. 19, 2013, the entire contents of which are hereby incorporated by reference for all purposes.

FIELD

The present disclosure relates to methods and systems for detecting and addressing spark plug fouling due to fuel additives in an internal combustion engine.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug insulator becomes coated with a foreign substance, such as fuel, oil, or soot. Once fouled, the spark plug may be unable to provide adequate voltage to trigger cylinder combustion until the spark plug is sufficiently cleaned or changed.

In areas with poor fuel quality control, spark plug fouling and pre-ignition caused by hot spark plugs is a significant issue. Fuel additives such as methycyclopentadienyl manganese tricarbonyl (MMT), lead or ferrocene may build up electrically conductive and thermally insulating deposits on the spark plug ceramic. Such build up may cause pre-ignition (PI), and consequently engine damage. The build-up can also cause misfires. The fuel additives can also coat combustion chambers leading to an increase in cylinder compression ratio and higher occurrence of combustion knock cycles. Further, the accumulation of fuel additive may not be easily removed.

In one example, the issues associated with spark plug fouling and the related pre-ignition can be addressed by a method for inferring spark plug fouling due to accumulation of fuel additives. The early detection enables appropriate mitigating steps to be taken in a timely manner, thereby pre-empting engine degradation. One example method comprises: inferring spark plug fouling due to accumulation of fuel additive based on a combination of two or more of a change in an adaptive knock term, an engine pre-ignition rate, an exhaust oxygen sensor degradation rate, and exhaust catalyst degradation rate over a vehicle drive cycle. In this way, spark plug fouling from additives can be more reliably identified and accordingly addressed.

As an example, over a vehicle drive cycle, a controller may monitor a plurality of parameters correlated with spark plug health. These may include changes in an adaptive knock term, engine pre-ignition rate, engine misfire rate, engine exhaust catalyst degradation rate, and an exhaust oxygen sensor degradation rate. For example, the controller may monitor the change in spark angle retard applied at a given engine speed-load operating point over the vehicle drive cycle. The adaptive knock term may be monitored over a predetermined duration (e.g., time or number of engine cycles) of engine operation or predetermined distance of vehicle travel. In response to an increase in knocking rates with a progressively larger change in the adaptive knock term, spark plug fouling may be suggested. As another example, the controller may monitor an engine pre-ignition rate over a predetermined duration (e.g., time or number of engine cycles) of engine operation or predetermined distance of vehicle travel. If the pre-ignition rate is higher than a threshold rate (e.g., a threshold rate based on the engine's pre-ignition history), spark plug fouling may be suggested. As yet another example, the controller may monitor an engine misfire rate over a predetermined duration (e.g., time or number of engine cycles) of engine operation or predetermined distance of vehicle travel. If the misfire rate is higher than a threshold rate (e.g., a threshold rate based on the engine's misfire history), spark plug fouling may be suggested. As still another example, the controller may monitor a degradation rate of an exhaust oxygen sensor located upstream of an exhaust catalyst. In one example, the exhaust oxygen sensor degradation rate may be based on a switching frequency or response time of the exhaust oxygen sensor, the degradation rate increasing for decreasing switching frequency. As another example, the controller may monitor a degradation rate of an exhaust catalyst. In one example, the exhaust catalyst degradation rate may be based on a switching frequency or response time of the exhaust gas oxygen sensor located upstream of the exhaust catalyst and a switching frequency or response time of an exhaust gas oxygen sensor located downstream of the exhaust catalyst. If the switching frequencies or response time of the pre-catalyst and post-catalyst oxygen sensors are less than a threshold difference from each other, or if a ratio of the pre-catalyst to post-catalyst switching frequency or response time is higher/lower than a threshold, spark plug fouling may be suggested.

As such, if only one of the parameters is affected, the controller may determine that the spark plug is not fouled due to accumulation of fuel additives and may possibly be fouled due to accumulation of soot. Accordingly, mitigating steps may be taken to burn off the soot and clean the spark plug. However, if multiple (e.g., two or more) of the monitored parameters are affected, then the controller may infer that the spark plugs has fouled due to accumulation of fuel additives, rather than due to soot. The multiple monitored parameters may have weighting factors associated with them so that they have to occur together, some parameters carrying a heavier weight to due being affected by fuel additives more than others. Accordingly, mitigating steps may be taken to reduce fouling induced pre-ignition, such as by decreasing engine load, deactivating fuel to one or more engine cylinders, etc. In addition, a diagnostic code may be set to recommend spark plug replacement.

In this way, by reliably identifying spark plug fouling due to fuel additives, spark plug fouling induced pre-ignition may be reduced and timely mitigated. By monitoring multiple parameters whose change can be associated with spark plug health, spark plug fouling due to fuel additive accumulation can be accurately deduced without needing to rely only on complex and costly approaches (e.g., switching current measurements). By monitoring changes in the output of pre- and post-exhaust catalyst air-fuel ratio sensors, catalyst degradation due to fuel additive accumulation may also be timely identified and addressed. By providing spark plug replacement recommendations based on evidence of malfunction or degradation, rather than a predetermined period of time or amount of vehicle usage, spark plug change recommendations may not be provided too soon, lowering overall vehicle operational costs for the driver, while also reducing the risk of engine pre-ignition. By diagnosing spark plug health, engine life is extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
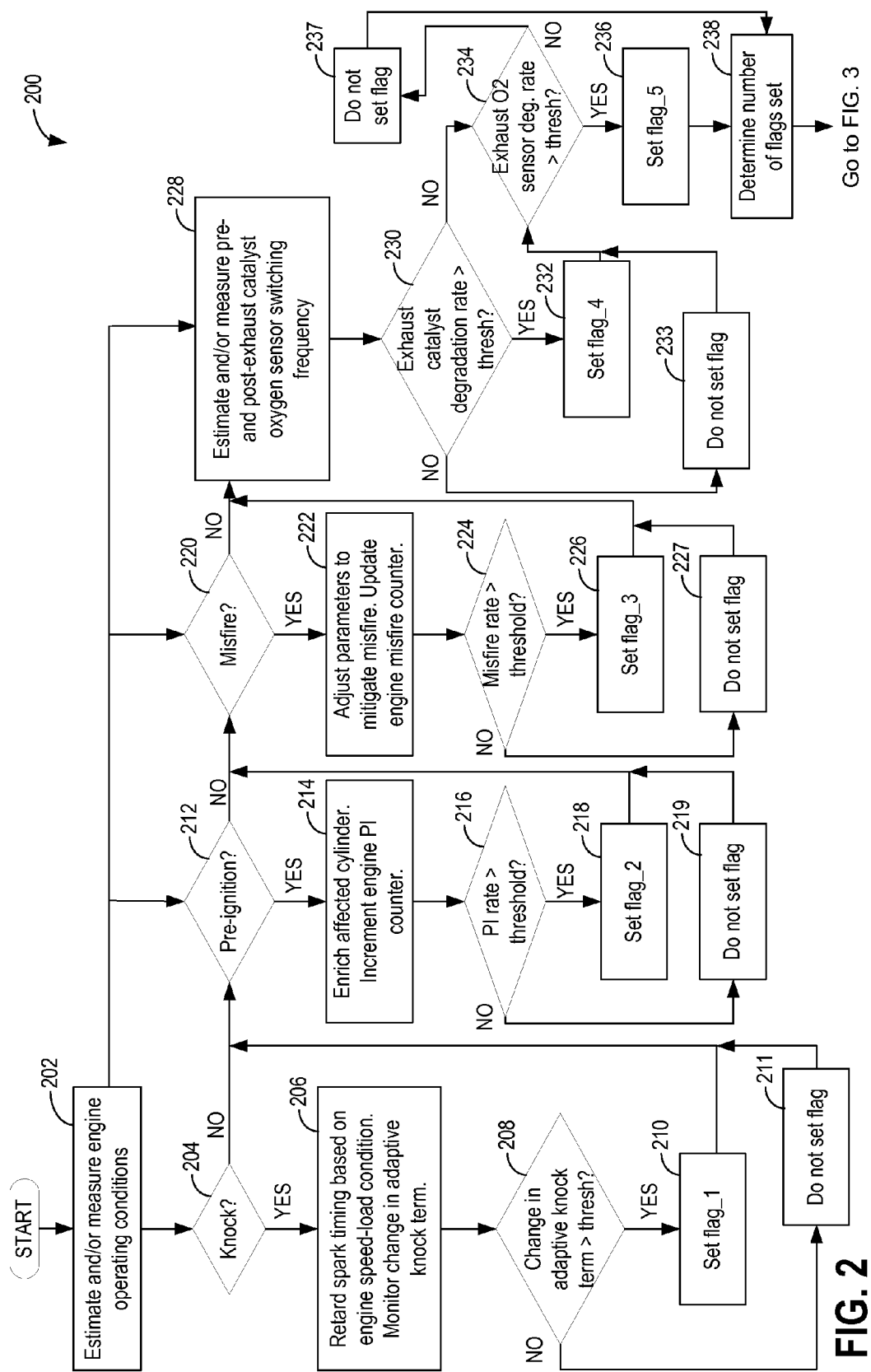
FIG. 2 shows a flow diagram of a method for inferring spark plug fouling from fuel additives based on a combination of engine operating parameters.
Figure 3:
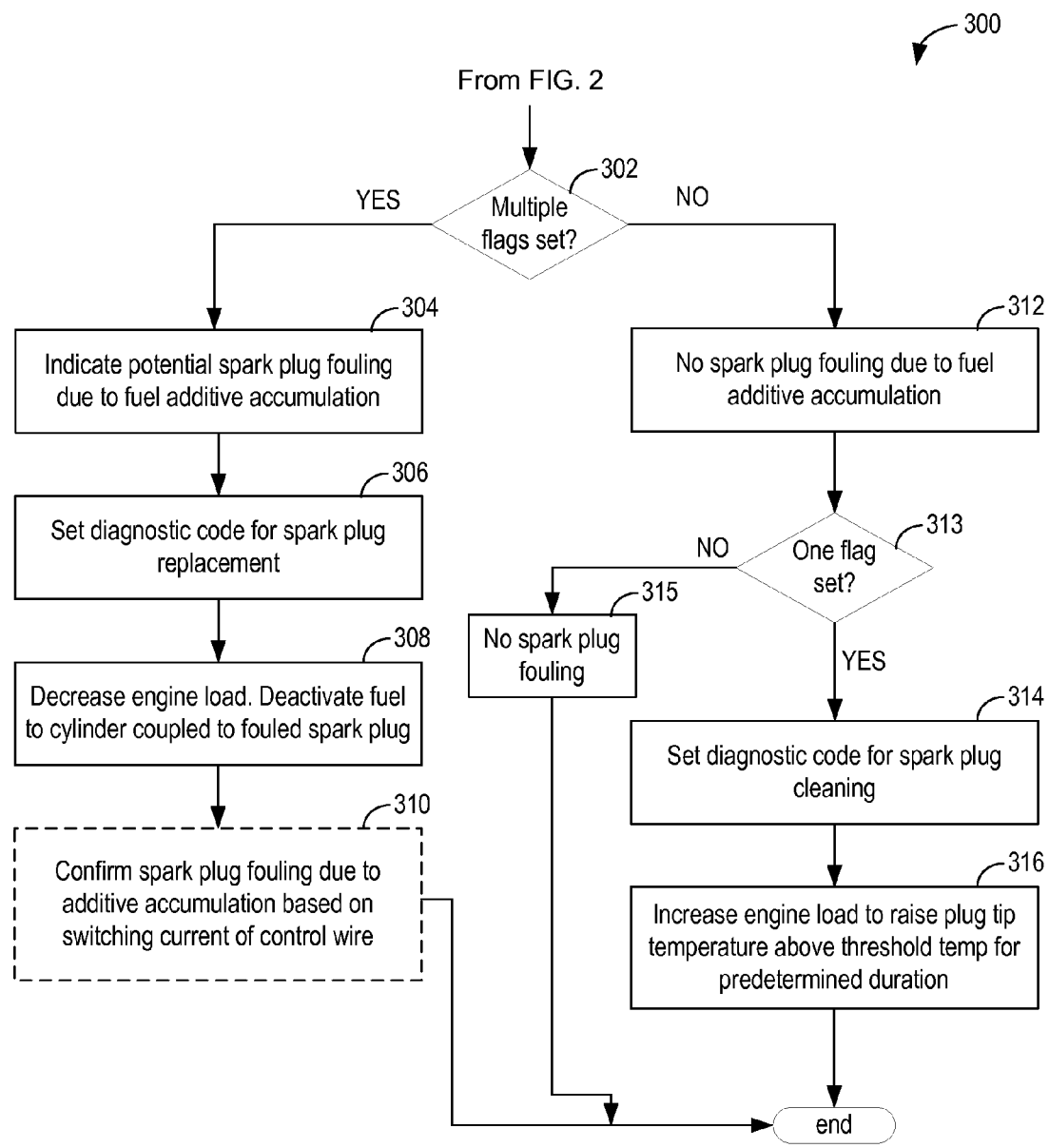
FIG. 3 shows a flow diagram of a method for determining mitigating actions based on an inferred type of spark plug fouling.

The following description relates to systems and methods for inferring spark plug fouling due to accumulation of fuel additives thereon. The spark plugs are included in an engine system, such as the engine system of FIG. 1. Spark plug fouling may be inferred based on changes in a plurality of parameters correlated with spark plug health. FIG. 2 shows a method for monitoring the plurality of parameters for signs of spark plug fouling. For example, an engine controller may monitor changes in an adaptive knock term, engine pre-ignition rate, engine misfire rate, and engine exhaust oxygen sensor switching frequency (or other parameters indicating a rate of exhaust catalyst degradation or exhaust oxygen sensor degradation). These parameters may be monitored with respect to set thresholds. If one or more of the monitored parameters falls into a threshold range for inferring spark plug fouling, a flag may be set indicating possible spark plug fouling. Additionally, in lieu of flags these parameters may be weighted and considered in combination with other sensors in order to determine spark plug fouling. Based on the number of flags set over a vehicle drive cycle (or over multiple vehicle drive cycles), the engine control may determine if one or more spark plugs have been fouled from fuel additives. FIG. 3 shows a method for inferring spark plug fouling due to fuel additives (multiple flags set) or due to soot (only one flag set) and then taking mitigating actions to either clean the spark plug, reduce pre-ignition, and/or replace the spark plugs. In this way, early detection of spark plug fouling enables appropriate mitigating steps to be taken, thereby reducing engine degradation.

Figure 1:
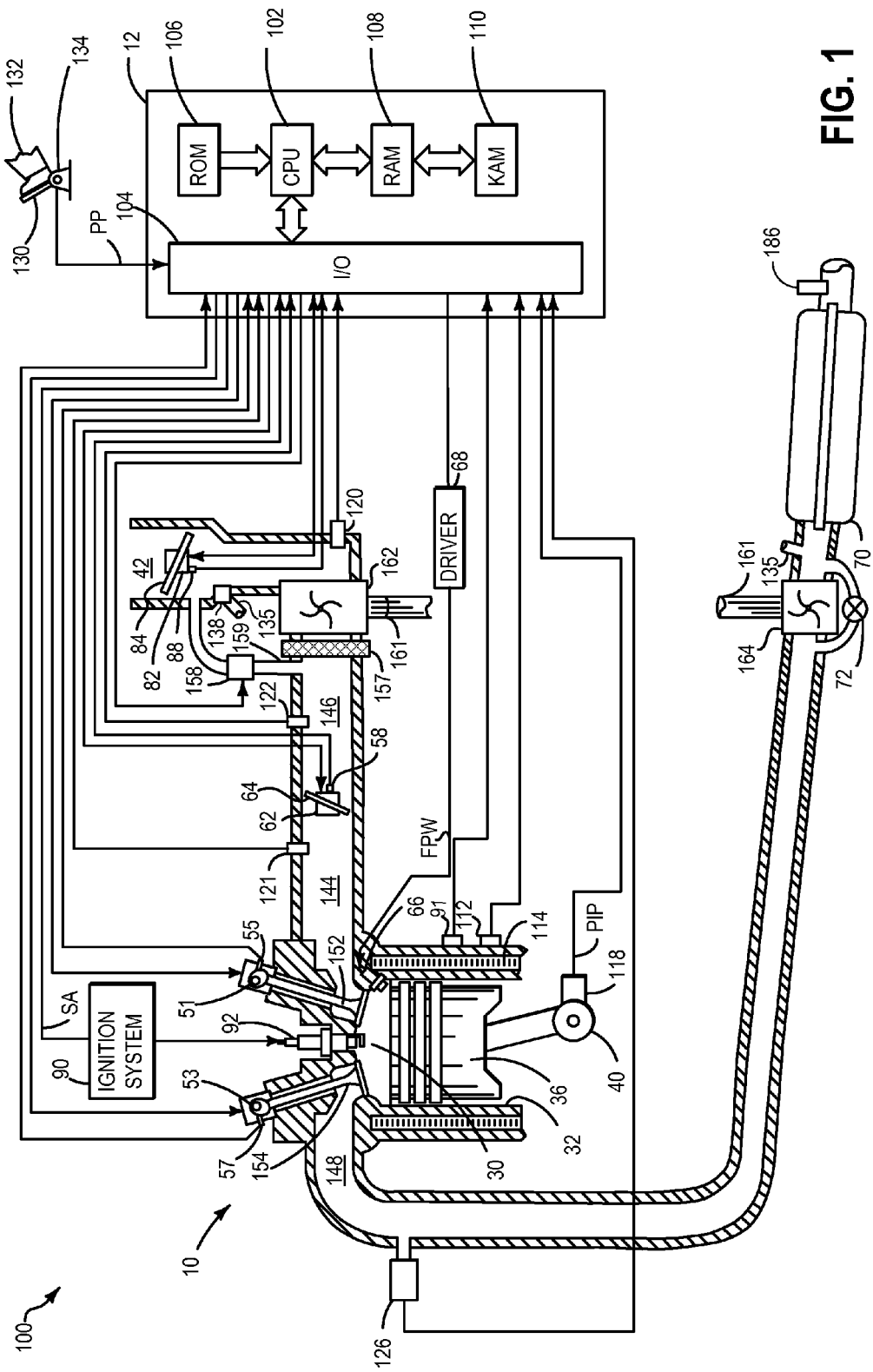
FIG. 1 is a schematic diagram of an engine.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12. Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In addition, intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the boost chamber 146.

In some embodiments, engine 10 is configured to provide exhaust gas recirculation, or EGR. When included, EGR is provided via EGR passage 135 and EGR valve 138 to the engine air intake system at a position downstream of air intake system (AIS) throttle 82 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Compressor 162 draws air from air intake passage 42 to supply boost chamber 146. In some examples, air intake passage 42 may include an air box (not shown) with a filter. Exhaust gases spin turbine 164 which is coupled to compressor 162 via shaft 161. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in passage 146, downstream of compressor 162, for cooling the boosted aircharge delivered to the engine intake. In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Distributorless ignition system 90 provides an ignition spark to combustion chamber 30 via spark plug 92 in response to controller 12. The ignition system 90 may include an induction coil ignition system, in which an ignition coil transformer is connected to each spark plug of the engine.

A first exhaust oxygen sensor 126 is shown coupled to exhaust manifold 148 upstream of catalytic converter 70. A second exhaust oxygen sensor 186 is shown coupled in the exhaust downstream of the converter 70. The first exhaust oxygen sensor 126 and the second exhaust oxygen sensor 186 may be any one of a Universal Exhaust Gas Oxygen (UEGO) sensor, a heated exhaust oxygen sensor (HEGO), or two-state exhaust oxygen sensor (EGO). The UEGO may be a linear sensor wherein the output is a linear pumping current proportional to an air-fuel ratio.

Converter 70 includes an exhaust catalyst. For example, the converter 70 can include multiple catalyst bricks. In another example, multiple emission control devices, each with multiple bricks, can be used. Converter 70 can be a three-way type catalyst in one example. While the depicted example shows first exhaust oxygen sensor 126 upstream of turbine 164, it will be appreciated that in alternate embodiments, the first exhaust oxygen sensor 126 may be positioned in the exhaust manifold downstream of turbine 164 and upstream of convertor 70. Further, the first exhaust oxygen sensor 126 may be referred to herein as the pre-catalyst oxygen sensor and the second exhaust oxygen sensor 186 may be referred to herein as the post-catalyst oxygen sensor. The first and second oxygen sensors may give an indication of exhaust air-fuel ratio. For example, the second exhaust oxygen sensor 186 may be used for catalyst monitoring while the first exhaust oxygen sensor 126 may be used for engine control. Further, both the first exhaust oxygen sensor 126 and the second exhaust oxygen sensor 186 may operate at a switching frequency or response time in which the sensor switches between lean and rich air-fuel control (e.g., switches from lean to rich or from rich to lean). In one example, an exhaust oxygen sensor degradation rate may be based on the switching frequency of the sensor, the degradation rate increasing for decreasing switching frequency. In another example, the exhaust oxygen sensor degradation rate may be based on a response time of the exhaust oxygen sensor, the degradation rate increasing for decreasing response time. For example, if the sensor is a linear sensor (such as a UEGO), the sensor degradation rate may be based on the response time of the sensor. Alternatively, if the sensor is not a linear sensor (such as a HEGO), the sensor degradation rate may based on the switching frequency of the sensor. For the purposes of describing the methods below, switching frequency and response time may be used interchangeably in inferring spark plug fouling. However, in some embodiments, the analysis of switching frequency vs. response time may be based on whether the exhaust oxygen sensor is nonlinear or linear, respectively.

Engine 10 may further include one (as depicted) or more knock sensors 91 distributed along a body of the engine (e.g., along an engine block). When included, the plurality of knock sensors may be distributed symmetrically or asymmetrically along the engine block. Knock sensor 91 may be an accelerometer (e.g., vibration sensor), an ionization sensor, or an in-cylinder transducer. In one example, the controller 12 may be configured to detect engine block vibrations generated due to abnormal combustion events, such as knocking and pre-ignition with the knock sensor 91.

Further, the controller 12 may be configured to perform adaptive knock control. Specifically, the controller 12 may apply a certain amount of spark angle retard to the ignition timing in response to sensing knock with the knock sensor 91. The amount of spark retard at the current speed-load operating point may be determined based on values stored in a speed/load characteristic map. This may be referred to as the adaptive knock term. When the engine is operating in the same speed-load region again, the adaptive knock term at the speed-load operation point may be updated. In this way, the adaptive knock term may be updated during engine operation. The adaptive knock term may be monitored over a predetermined duration (e.g., time or number of engine cycles) of engine operation or predetermined distance of vehicle travel. If knocking rates increase with an increasing change in the adaptive knock term, spark plug fouling may be indicated. As such, the controller may monitor knock via the knock sensor 91, as well as changes in the adaptive knock term in order to infer a level of spark plug fouling, as described further below with reference to FIGS. 2-3.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position (PP) adjusted by a foot 132 of a vehicle operator; a knock sensor for determining ignition of end gases; a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 (or other variable reluctance sensor) sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is described merely as an example, and that intake and exhaust valve opening and/or closing timings may vary, such as to provide positive or negative valve overlap, late intake valve closing, or various other examples.

In one embodiment, an ignition coil circuit may include spark plug fouling detection components. In this embodiment, spark plug fouling may be determined based on a switching time taken for a control current of a control wire of an ignition coil to drop below a predetermined value after application of a dwell command. However, this method of detecting spark plug fouling may be complex and expensive to implement. Thus, not all engine systems may include an ignition coil circuit having spark plug fouling detecting components. Instead, the controller may monitor a plurality of engine operating parameters correlated with spark plug health and infer spark plug fouling due to fuel additive accumulation based on changes of one or more of the plurality of engine operating parameters.

The parameters monitored for spark plug fouling may include one or more of an adaptive knock term, an engine pre-ignition rate, an engine misfire rate, an exhaust catalyst degradation rate, and an exhaust oxygen sensor degradation rate. The exhaust catalyst and exhaust oxygen sensor degradation rates may be based on switching frequencies (or response times) of one or more exhaust oxygen sensors. Changes in one or more of these parameters relative to set thresholds may indicate possible spark plug fouling. If only one of the parameters is affected, the controller may determine that the spark plug has not fouled due to the accumulation of fuel additives. It may be possible that the spark plug is fouled due to soot. In this case, the controller may take mitigating actions in order to remove the possible soot from the spark plug (e.g., by increasing the spark plug temperature and burning off the soot). However, if multiple (e.g., two or more) of the monitored parameters are affected, then the controller may infer that the spark plugs has fouled due to accumulation of fuel additives, rather than due to soot. As an increasing number of the monitored parameters are affected, a degree of inferred spark plug fouling may increase. Accordingly, mitigating steps may be taken to reduce fouling induced pre-ignition, such as by decreasing engine load, deactivating fuel to one or more engine cylinders, etc. In addition, a diagnostic code may be set to recommend spark plug replacement.

A method 200 for monitoring the above described parameters and setting the flags for possible spark plug fouling is shown at FIG. 2. Specifically, method 200 may include monitoring a plurality of engine operating parameters related to spark plug health. Instructions for carrying out method 200 may be stored on an engine controller (such as controller 12 shown in FIG. 1). Further, the controller may execute the method 200 according to the instructions. As the parameters described in method 200 degrade from standard or previous levels, the controller may infer possible spark plug fouling due to fuel additives. In one example, the controller may monitor the parameters. The controller may set a flag indicating possible spark plug fouling for each parameter that enters a pre-determined spark plug fouling range, the range based on set parameter thresholds. If more than one flag is set, the controller may infer spark plug fouling. Additionally, as the number of flags set increases, the controller may infer an increased level or amount of spark plug fouling (e.g., determine a relative severity of spark plug fouling).

Method 200 begins at 202 by estimating and/or measuring engine operating conditions. Engine operating conditions may include engine speed and load, mass air flow, torque demand, boost, manifold pressure (MAP), manifold air-charge temperature (MCT), air-fuel ratio (lambda), fuel alcohol content, barometric pressure, ambient conditions (e.g., ambient temperature, pressure, humidity, etc.), engine pre-ignition history, crankshaft acceleration, knock rate, exhaust oxygen sensor switching frequency, etc.

At 204, the method includes determining if knock is occurring and/or has occurred over a set period of time (e.g., number of combustion cycles or duration of engine operation). As described above, the controller may monitor engine knock with a knock sensor. If knock is detected, the method continues to 206 to adjust spark retard based on a stored engine speed-load condition. The controller may also update and track the changing adaptive knock term. In some examples, spark plug fouling from fuel additives may cause the knock rate to increase and/or the rate of change of the adaptive knock term to increase over a number of engine combustion cycles (or a number of miles traveled or an amount of time of engine operation). At 208, the controller determines if the change in the adaptive knock term is greater than a threshold (e.g., faster than a threshold rate). In one example, this may include a rate of change in the adaptive knock term increasing above a threshold rate. The threshold may be based on an increase in a knocking rate indicative of spark plug fouling. For example, at each fuel fill up the adaptive knock term may be stored. Then, the controller may track the rate of change in the adaptive knock term over a series of fuel refilling events. In an alternate embodiment, the adaptive knock term may be monitored over a series of combustion cycles, a duration engine operation, and/or a distance of vehicle travel. As such, if the rate of change of the adaptive knock term is increasing Thus, at 208, the method may include determining if the knocking rate increases above a threshold rate (over a number of vehicle/engine cycles or duration of engine operation). If the knocking rate increases above a threshold and/or the rate of change in the adaptive knock term increases above a threshold, the controller may set a flag (e.g., flag_1) at 210 indicating possible spark plug fouling. The flag_1 may be a flag indicating possible spark plug fouling as inferred by the adaptive knock term. In some examples, the flag may include an estimate of a possible level of spark plug fouling based on the rate of change in the adaptive knock term. For example, as the rate increases further above the threshold, spark plug fouling may be more severe. If the changes in adaptive knock term and/or knocking rate are not over their respective thresholds at 208, the method includes not setting the flag at 211.

At 212, the method includes determining if pre-ignition is occurring or has occurred in a set amount of time. If the controller detects pre-ignition is one or more cylinders, the method continues to 214 to enrich the air-fuel ratio in the affected cylinder. This may include adjusting fuel injection to the affected cylinder. The controller may also increment an engine pre-ignition (PI) counter. The PI counter may keep track of a number of pre-ignition events occurring in the engine. The controller may then monitor the number of pre-ignition events over a duration. As a result, the controller may determine a pre-ignition rate for the duration. The duration may include an amount of time of engine operation, a number of engine cycles, and/or a number of miles traveled by the vehicle. In another example, the PI counter may keep track of a number of PI events occurring in the engine under a certain set of operating conditions. For example, if a first PI occurs when engine speed is below a threshold, the first PI event may not be counted by the PI counter. However, if a second PI event occurs when engine speed is above the threshold speed, the second PI event may be counted by the PI counter, thereby counting towards an indication of possible fouling. In this way, one or more of the flags set in method 200 may be set in specific engine operating regions, or a weighting factor of the flags or fouling conditions may be higher in engine operating regions where there is a higher chance that the condition (e.g., PI) is occurring due to spark plug fouling.

At 216, the controller determines if the pre-ignition rate has increased above a threshold rate. In one example, this may include a rate of change in pre-ignition over a duration increasing above a threshold rate. The threshold rate may be based on a pre-ignition rate in a vehicle without fouled spark plugs or without fuel additives (e.g., an engine not exposed to fuel additives). In another example, the threshold rate may be based on a pre-ignition rate during engine operation with a fuel not including fuel additives. If the pre-ignition rate (e.g., rate of change over the duration) is over the threshold rate, the controller may set a flag (flag_2) at 218 indicating possible spark plug fouling. Additionally or alternatively, if the pre-ignition rate is increasing by a threshold amount over a period of time (or number of engine cycles, the controller may set the flag indicating possible spark plug fouling. The flag_2 may be a flag indicating possible spark plug fouling as inferred by the pre-ignition rate or number of pre-ignition events. In some examples, the flag may include an estimate of a possible level of spark plug fouling based on the rate of pre-ignition. For example, as the PI rate increases further above the threshold, spark plug fouling may be more severe. If the pre-ignition rate is not greater than the threshold at 216, the method includes not setting the flag at 219.

At 220, the method includes determining if misfire (e.g., cylinder misfire) has occurred. In one example, cylinder misfire may be detected based on crankshaft acceleration. In another example, cylinder misfire may be based on an exhaust air-fuel ratio, for example, based on the output of an exhaust gas oxygen sensor. In still another example, cylinder misfire may be based on spark plug ionization (e.g., ionization current) as determined by an ionization sensor coupled to the spark plug (if the ionization sensor is included in the ignition system of the engine). If cylinder misfire is detected, the method continues on to 222 to adjust engine operating parameters to mitigate misfire. In one example, misfire mitigating actions may include one or more of adjusting spark timing or fuel injection. For example, if misfire is detected fuel may be disabled to the cylinder that misfired. Additionally or alternatively, fuel delivered to a cylinder adjacent to the affected cylinder may be temporarily enriched for a number of combustion events. The method at 222 may also include updating an engine misfire counter. For example, each time a misfire occurs, the controller may increment the misfire counter in order to track the number of misfire events over a duration. As a result, the controller may determine an engine misfire rate over the duration (e.g., a rate of change of engine misfire over the duration). In one example, the duration may be a predetermined duration of engine operation (e.g., number of engine cycles or period of time) or a predetermined distance of vehicle travel. At 224, the controller determines if the misfire rate is higher than a threshold rate. In one example the threshold may be based on the engine's misfire rate. As such, the threshold rate may be a threshold amount above a standard misfire rate due to normal engine operation with fuel not containing fuel additives. If the misfire rate is greater than the threshold, the controller sets a flag (flag_3) at 226 indicating possible spark plug fouling. Additionally or alternatively, if the misfire rate is increasing at a threshold rate (or by a threshold amount) over the duration, the controller may set the flag indicating possible spark plug fouling.

The flag_3 may be a flag indicating possible spark plug fouling as inferred from the misfire rate or number of misfires over the duration. In some examples, the flag may include an estimate of a possible level of spark plug fouling based on the misfire rate. For example, as the misfire rate increases further above the threshold, spark plug fouling may be more severe. If the misfire is not greater than the threshold at 224, the method includes not setting the flag at 227. Furthermore, misfires can be tracked for recent drive cycles (e.g., key on to key off). Misfires that occur and resolve over a lower threshold number of drive cycles may be indicative of soot fouling while misfires that are persistent over many drive cycles (e.g., over the lower threshold number) may be indicative of fuel additive fouling. In another example, misfires that are distributed relatively evenly over all the engine cylinders may be indicative of soot fouling while a persistent misfire in a single cylinder may be indicative of spark plug fouling due to fuel additives.

At 228, the controller estimates and/or measures a first switching frequency or response time of first exhaust oxygen sensor positioned upstream of an exhaust catalyst (e.g., an upstream exhaust oxygen sensor such as exhaust oxygen sensor 126 shown in FIG. 1, referred to herein as the pre-catalyst oxygen sensor) and a second switching frequency or response time of a second exhaust oxygen sensor positioned downstream of the exhaust catalyst (e.g., a downstream exhaust oxygen sensor such as exhaust oxygen sensor 186 shown in FIG. 1, referred to herein as the post-catalyst oxygen sensor). Fuel additives may also accumulate on and foul the exhaust oxygen sensors, as well as cause exhaust catalyst degradation. If either or both of sensor degradation and/or exhaust catalyst degradation occur, spark plug fouling due to fuel additives may also be possible.

At 230, the method includes determining if a rate of exhaust catalyst degradation is greater than a threshold (or if the rate of change in the exhaust catalyst degradation rate is greater than a threshold). The threshold may be based on a standard exhaust catalyst decay rate in engines operating with fuel not containing fuel additives. For example, the decay rate in an engine combusting fuel with fuel additives may be faster than the decay rate in an engine only exposed to nominal fuels (e.g., fuels without additives). In one example, the exhaust catalyst degradation rate may be based on a switching frequency or response time difference between the pre- and post-catalyst oxygen sensors. For example, if an absolute value of a difference between the first switching frequency or response time of the pre-catalyst oxygen sensor (Sw_freq_pre) and the second switching frequency or response time of the post-catalyst oxygen sensors (Sw_freq_post) is less than a threshold difference, spark plug fouling may be indicated. The threshold difference may be based on standard exhaust catalyst decay rates in engines operating with fuel not containing fuel additives. Additionally or alternatively, if a ratio of the pre-catalyst to post-catalyst switching frequency (or response time) is within a threshold of one, the exhaust catalyst degradation rate may be above the threshold and spark plug fouling may be indicated. A switching frequency ratio or response time of one may indicate the two frequencies or response times are substantially the same and the exhaust catalyst is degraded. As such, if the switching frequency or response time difference is below the threshold and/or the switching frequency ratio or response time ratio between the two exhaust sensors is within the threshold of one, the controller may set a flag (flag_4) at 232. In another embodiment, different methods may be used to determine the degradation rate of the exhaust catalyst. If the exhaust catalyst degradation rate is greater than the threshold degradation rate, the controller sets flag_4 at 232. The flag_4 may be a flag indicating possible spark plug fouling as inferred from the exhaust catalyst degradation rate (which may be determined by the switching frequency or response time difference or ratio between the pre-catalyst oxygen sensor and the post-catalyst oxygen sensor). In some examples, the flag may include an estimate of a possible level of spark plug fouling based on the switching frequency difference or response time or ratio. For example, as the exhaust catalyst degradation rate increases further above the threshold (or the switching frequency or response time difference decreases further below the switching frequency or response time threshold), spark plug fouling may be more severe. If the exhaust catalyst degradation rate is not greater than the threshold at 230, the method includes not setting the flag at 233.

At 234, the method includes determining if the pre-catalyst exhaust oxygen sensor degradation rate (e.g., rate of change of degradation) is greater than a threshold. In one example, the degradation rate may be based on the switching frequency or response time of the pre-catalyst oxygen sensor. For example, if the switching frequency or response time of the pre-catalyst oxygen sensor is below a threshold switching frequency or response time, the sensor degradation rate may be greater than the threshold degradation rate. As fouling and degradation of the pre-catalyst oxygen sensor increases, the switching frequency or response time decreases. As such, the threshold may be based on a switching frequency or response time of an un-fouled oxygen sensor or a switching frequency or response time decay rate in a standard engine using fuel not containing fuel additives. If the switching frequency or response time of the pre-catalyst oxygen sensor is below the threshold and/or the exhaust oxygen sensor degradation rate is greater than the threshold degradation rate, the controller sets a flag (flag_5) at 236. The flag_5 may be a flag indicating possible spark plug fouling as inferred from the degradation rate (or the switching frequency or response time) of the pre-catalyst oxygen sensor. In some examples, the flag may include an estimate of a possible level of spark plug fouling based on the switching frequency or response time. For example, as the degradation rate increases further above the threshold (or as the switching frequency or response time decreases further below the threshold switching frequency or response time), spark plug fouling may be more severe. If the pre-catalyst oxygen sensor degradation rate is not greater than the threshold at 234, the method includes not setting the flag at 237.

After checking all the above parameters relative to the set thresholds, the method continues on to 238 to determine the number of flags set. In one example, this may include adding the total number of flags set. In another example, the method may include determining a weighted number of flags set. For example, each flag may (e.g., flag_1, flag_2, flag_3, etc.) may have a different weight associated with the flag. Different parameters may be stronger indicators of spark plug fouling. For example, an adaptive knock term, pre-ignition, or misfire may be more strongly influenced by fuel additive fouling than a decrease in switching frequency or response time of the pre-catalyst oxygen sensor since additional noise factors may impact the decay rates of the exhaust gas sensor or exhaust catalyst. Further, degradation of the switching frequency or catalyst performance alone may indicate a need to service and/or replace the exhaust oxygen sensor and/or the catalyst. Thus, the controller may weight each flag differently, giving a larger weight to the parameters more likely to infer spark plug fouling. The controller may then add up the resulting weighted flags to determine the weighted number of flags set. Once the number (normal or weighted) of flags are determined, the method continues on to determine the appropriate mitigating actions or indicator messages and diagnostic codes based on the inferred type of spark plug fouling, as shown at FIG. 3. In this way, different combinations of the engine operating parameters, or flags, may indicate a higher or lower amount of spark plug fouling and whether the spark plug fouling is most likely due to fuel additives or soot, as described further at FIG. 3.

FIG. 3 shows a method 300 which continues from method 200 at FIG. 2. As such, method 300 shows taking mitigating actions based on the number of flags (normal or weighted) set during method 200. Specifically, at 302 the method includes determining if multiple flags are set. In another embodiment, the method at 302 may include determining if the number or weighted number of flags set is greater than a threshold number of flags. The threshold number of flags may be based on a number of flags indicating that degradation of the engine operating parameters described at method 200 may be due to fuel additives. As such, if multiple flags or a number of flags over the threshold number are set, the controller may infer spark plug fouling due to fuel additive accumulation at 304. At 306, the method includes setting a diagnostic code for spark plug replacement. In one example, this may include alerting the vehicle operator that the spark plugs need to be replaced. Upon changing/replacing of the spark plugs (as indicated by a user input or reset input after replacing the spark plugs), the controller may reset a monitor (e.g., counter) configured to count each of the change in adaptive knock term, the engine pre-ignition rate, the misfire rate, the engine exhaust catalyst switching frequency or response time, and the pre-catalyst switching frequency over a given vehicle drive cycle. For example, resetting the monitor may include resetting the monitor based on an age of the spark plug (e.g., the spark plug being replaced) relative to an age of one or more additional engine components including an exhaust oxygen sensor. The additional engine components may include one or more of an upstream exhaust oxygen sensor, a downstream exhaust oxygen sensor, fuel injectors, piston rings, cylinders, etc. Further, the reset value may be determined based on a degradation rate curve. The degradation rate curve may include a reset value based on an age of the engine components, the reset value increasing (e.g., further from zero or complete reset) with increasing age of engine components. Since the additional engine components have been exposed to fuel additives and are not replaced during replacing the spark plug, older engine components with potentially more fouling may increase the rate of degradation of the new replaced spark plugs compared to newer engine components that have been exposed to little or no fuel additives.

At 308, the controller may take actions to decrease pre-ignition, misfire, and other adverse events caused by the spark plug fouling. Specifically, the controller may decrease the engine load and/or deactivate fuel to the cylinder(s) coupled to the fouled spark plug(s). In one example, the method at 308 may include disabling fuel to a second cylinder not coupled to the fouled spark plug, the second cylinder configured to receive exhaust residuals from the first cylinder. In another example, the method at 308 may include temporarily enriching the second cylinder not coupled to the fouled spark plug, the second cylinder configured to receive exhaust residuals form the first cylinder.

At 310, the method may optionally confirm spark plug fouling due to fuel additive accumulation based on a switching current of a control wire of the spark plug ignition coil. If the switching current is greater than a threshold for a period of time longer than a second threshold, the spark plugs may be fouled. In one embodiment, the method may further include adjusting engine operation in order to increase the spark plug temperature and burn off any spark plug fouling due to soot. If spark plug fouling remains, then the spark plug fouling may be confirmed as being due to fuel additive accumulation. However, the method at 310 may not be performed in engines not including an ignition coil circuit configuration for determining spark plug fouling.

In yet another example, the switching current may also be one of the weighted inputs or flags included in method 200 (shown in FIG. 2). For example, fouling as indicated by measurements at the spark plug that come and go may more likely be due to soot. However, degradation of the switching current increasing over time may be a stronger indication of MMT or fouling based on heavy metals.

Returning to 302, if one or fewer flags are set, the method continues to 312 to indicate no spark plug fouling due to fuel additive accumulation. The method then continues on to 313 to determine if one flag is set (e.g., at least one flag). If one flag is not set (e.g., no flags are set), the method continues on to indicate no spark plug fouling (from soot or fuel additives) at 315. The method then ends with no diagnostic codes being set. In some examples, if only one flag is set, spark plug fouling due to soot may be indicated. Thus, in one example, as shown at 314, the controller may set a diagnostic code for spark plug cleaning responsive to one flag being set. Then, at 316, the controller may then increase engine load in order to raise the spark plug tip temperature above a threshold temperature for a predetermined duration (e.g., a number of combustion cycles). In another example, the controller may advance spark at 316 in order to increase the spark plug temperature. If the cleaning procedure does not work and the spark plug remains fouled, fouling due to fuel additives is more likely and service may be recommended, as shown at 306. In one embodiment, the method may include re-checking the operation parameters at FIG. 2. If the same or more flags are subsequently set, the controller may set a diagnostic code indicating possible spark plug fouling due to fuel additives. In another example, the method at 314 may alternately include operating the engine for a threshold number of combustion cycles. After the threshold number of combustion cycles, the method may include re-checking for spark plug fouling as described above. In this way, if the spark plugs are fouled due to soot, running the engine for the threshold number of combustion cycles may resolve the soot fouling without actively increasing the spark plug temperature to burn off soot. Thus, the method at 314 may include actively cleaning the spark plugs via increasing the spark plug temperature or trying to resolve the spark plug fouling inactively by operating the engine for a number of combustion cycles so that fouling may resolve naturally.

In this way, inferring spark plug fouling due to fuel additives based on engine operating parameters may provide for a cheaper and less complex method for determining spark plug fouling over switching current measurements. Further, by monitoring multiple parameters whose change may be associated with spark plug health, a severity and/or possibility of spark plug fouling from fuel additives may be deduced. Additionally, actions may be taken based on determined spark plug fouling in order to reduce the amount of fouling, mitigate the effects of fouled spark plugs, and/or replace the fouled spark plugs. As a result, engine degradation may be reduced, thereby increasing the life of the engine.

As one embodiment, a method for an engine comprises: inferring spark plug fouling due to accumulation of fuel additive based on a combination of two or more of a change in an adaptive knock term, an engine pre-ignition rate, an engine misfire rate, an exhaust oxygen sensor degradation rate, and exhaust catalyst degradation rate over a vehicle drive cycle. As one example, the adaptive knock term includes an amount of spark retard applied at a given engine speed-load condition during the drive cycle and the method further comprises indicating the fouling due to accumulation by setting a diagnostic code. Inferring based on the change in adaptive knock term may include inferring spark plug fouling based on the change in adaptive knock term over a number of engine cycles, where the number of engine cycles is included within one of a given vehicle drive cycle or different vehicle drive cycles, the different vehicle drive cycles separated by a vehicle event including a fuel filling event. As another example, the engine pre-ignition rate includes a number of pre-ignition events over one of a threshold duration of a vehicle drive cycle or a threshold distance traveled during the vehicle drive cycle, the threshold duration including one of a threshold amount of time, a threshold number of combustion events, or an amount of fuel consumed at the engine. Inferring based on the pre-ignition rate may include inferring spark plug fouling based on the pre-ignition rate being higher than a threshold rate, the threshold rate based on a pre-ignition occurrence rate established during vehicle operation with a fuel not including fuel additives. In another example, inferring based on the pre-ignition rate includes inferring spark fouling based on the pre-ignition rate increasing by a threshold amount over the threshold duration. As yet another example, inferring based on the exhaust catalyst degradation rate includes inferring spark plug fouling based on the exhaust catalyst degradation rate increasing above a threshold, the exhaust catalyst degradation rate based on an exhaust oxygen sensor switching frequency, the exhaust oxygen sensor switching frequency including one or more of a switching frequency of a first exhaust oxygen sensor coupled upstream of an engine exhaust catalyst, a switching frequency of a second exhaust oxygen sensor coupled downstream of the exhaust catalyst, and a ratio of the switching frequency of the first exhaust oxygen sensor relative to the switching frequency of the second exhaust oxygen sensor. The exhaust catalyst degradation rate is further based on the switching frequency of the first exhaust oxygen sensor being within a threshold difference from the switching frequency of the second exhaust gas oxygen sensor, or the ratio of the switching frequency of the first exhaust oxygen sensor relative to the switching frequency of the second exhaust oxygen sensor being a threshold amount from one. For example, the threshold difference and the threshold amount are based on a pre-determined switching frequency degradation rates in an engine combusting fuel not containing fuel additives. Further, inferring based on the exhaust oxygen sensor degradation rate may include inferring spark plug fouling based on the exhaust oxygen sensor degradation rate increasing above a threshold, the exhaust oxygen sensor degradation rate based on the switching frequency of the first exhaust oxygen sensor decreasing below a threshold. The threshold may be based on a pre-determined switching frequency degradation rate in an engine combusting fuel not containing fuel additives. Further still, the inferring based on the engine misfire rate over the vehicle drive cycle includes inferring spark plug fouling based on the engine misfire rate being higher than a threshold rate, the threshold rate based on a misfire rate established during vehicle operation with a fuel not including fuel additives.

The method may further comprise in response to the inferring, indicating spark plug fouling due to accumulation of fuel additive by setting a diagnostic code, the diagnostic code requesting spark plug replacement. The indicating spark plug fouling due to accumulation of fuel additive may include indicating spark plug fouling is not due to accumulation of soot. The method may further comprise receiving operator input regarding replacement of the spark plug, and in response to the operator input, resetting a monitor configured to count each of the change in adaptive knock term, the engine pre-ignition rate, engine misfire rate, and the engine exhaust catalyst switching frequency over a given vehicle drive cycle. In this way, the method may include establishing a new baseline for each of the monitors so fouling of a newly installed spark plug may be determined. In one example, the resetting is based on an age of the spark plug relative to an age of one or more other engine components including an exhaust oxygen sensor. In another example, the spark plug is coupled to a cylinder and the method further comprises, in response to the indication of spark plug fouling due to accumulation of fuel additive, decreasing an engine load, and disabling fuel while maintaining spark ignition timing for the cylinder for a threshold duration, the threshold duration including a threshold number of combustion cycles.

As another embodiment, a method for an engine comprises: over a vehicle drive cycle, monitoring each of a plurality of parameters including a change in an adaptive knock term, an engine pre-ignition rate, an engine misfire rate, an exhaust catalyst degradation rate, and an exhaust oxygen sensor degradation rate. The method further comprises in response to two or more of the monitored parameters being higher than corresponding thresholds, indicating spark plug fouling due to fuel additive accumulation. In one example, the exhaust catalyst degradation rate is based on a ratio of response times of exhaust oxygen sensors located upstream and downstream of an exhaust catalyst. For example, the exhaust oxygen sensors may include a first oxygen sensor located upstream of the exhaust catalyst and a second oxygen sensor located downstream of the exhaust catalyst. In another example, the exhaust oxygen sensor degradation rate is based on a response times of one of the exhaust oxygen sensors located upstream of the exhaust catalyst.

The method further comprises, in response to only one of the monitored parameters being higher than the corresponding threshold, not indicating spark plug fouling due to fuel additive accumulation. The method further comprises, in response to the indicating spark plug fouling due to fuel additive accumulation, decreasing an engine load, and disabling fuel to a cylinder coupled to the fouled spark plug for a number of combustion events. In one example, the cylinder is a first cylinder and the method further comprises, in response to the indicating, disabling fuel to a second cylinder not coupled to the fouled spark plug, the second cylinder configured to receive exhaust residuals from the first cylinder. In another example, the cylinder is a first cylinder and the method further comprises, in response to indicating, temporarily enriching a second cylinder not coupled to the fouled spark plug, the second cylinder configured to receive exhaust residuals from the first cylinder. The method further comprises monitoring a control current of an ignition coil coupled to a spark plug and indicating spark plug fouling due to fuel additive accumulation in response to a switching time of the control current being above a threshold. In yet another example, the method further comprises indicating a severity of spark plug fouling due to fuel additives based on a number of the monitored parameters being higher than corresponding thresholds, the severity increasing with increasing number of monitored parameters higher than corresponding thresholds.

As yet another embodiment, an engine system comprises: an engine including a cylinder; an ignition system including an ignition coil and a control wire coupled to a spark plug of the cylinder; and a controller with computer readable instructions on non-transitory memory for: over a vehicle drive cycle, setting a diagnostic flag for each of a change in an adaptive knock term over a first threshold, an engine pre-ignition rate over a second threshold, an engine misfire rate over a third threshold, an exhaust catalyst degradation rate over a fourth threshold, and an exhaust oxygen sensor degradation rate over a fifth threshold. The method further comprises, during a first condition when two or more diagnostic flags are set, indicating fouling of the spark plug due to fuel additive accumulation and during a second condition when only one diagnostic flag is set, not indicating fouling of the spark plug due to fuel additive accumulation and initiating a spark plug cleaning routine. The spark plug cleaning routine may include increasing one or more of engine load, spark advance, and/or engine idle speed to raise a plug tip temperature of the spark plug above a threshold temperature for a predetermined duration. The method may further comprise confirming spark plug fouling due to fuel additive accumulation based on a switching current of the control wire of the spark plug.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
inferring spark plug fouling due to accumulation of fuel additive based on a combination of two or more of a change in an adaptive knock term, an engine pre-ignition rate, an engine misfire rate, an exhaust oxygen sensor degradation rate, and exhaust catalyst degradation rate over a vehicle drive cycle
in response to the inferring, indicating spark plug fouling due to accumulation of fuel additive
wherein the spark plug is coupled to a cylinder, in response to the indication of spark plug fouling due to accumulation of fuel additive, decreasing an engine load, and disabling fuel while maintaining spark ignition timing for the cylinder for a threshold duration, the threshold duration including a threshold number of combustion cycles.

2. The method of claim 1, wherein the adaptive knock term includes an amount of spark retard applied at a given engine speed-load condition during the drive cycle, the method further comprising indicating the fouling due to accumulation by setting a diagnostic code, and wherein inferring based on the change in adaptive knock term includes inferring spark plug fouling based on the change in adaptive knock term over a number of engine cycles, where the number of engine cycles is included within one of a given vehicle drive cycle or different vehicle drive cycles, the different vehicle drive cycles separated by a vehicle event including a fuel filling event.

3. The method of claim 1, wherein the engine pre-ignition rate includes a number of pre-ignition events over one of a threshold duration of a vehicle drive cycle or a threshold distance traveled during the vehicle drive cycle, the threshold duration including one of a threshold amount of time a threshold number of combustion events, or an amount of fuel consumed at the engine.

4. The method of claim 3, wherein inferring based on the pre-ignition rate includes inferring spark plug fouling based on the pre-ignition rate being higher than a threshold rate, the threshold rate based on a pre-ignition occurrence rate established during vehicle operation with a fuel not including fuel additives.

5. The method of claim 3, wherein inferring based on the pre-ignition rate includes inferring spark fouling based on the pre-ignition rate increasing by a threshold amount over the threshold duration.

6. The method of claim 1, wherein inferring based on the exhaust catalyst degradation rate includes inferring spark plug fouling based on the exhaust catalyst degradation rate increasing above a threshold, the exhaust catalyst degradation rate based on an exhaust oxygen sensor switching frequency, the exhaust oxygen sensor switching frequency including one or more of a switching frequency of a first exhaust oxygen sensor coupled upstream of an engine exhaust catalyst, a switching frequency of a second exhaust oxygen sensor coupled downstream of the exhaust catalyst, and a ratio of the switching frequency of the first exhaust oxygen sensor relative to the switching frequency of the second exhaust oxygen sensor.

7. The method of claim 6, wherein the exhaust catalyst degradation rate is further based on the switching frequency of the first exhaust oxygen sensor being within a threshold difference from the switching frequency of the second exhaust gas oxygen sensor, or the ratio of the switching frequency of the first exhaust oxygen sensor relative to the switching frequency of the second exhaust oxygen sensor being a threshold amount from one.

8. The method of claim 1, wherein the inferring based on the engine misfire rate over the vehicle drive cycle includes inferring spark plug fouling based on the engine misfire rate being higher than a threshold rate, the threshold rate based on a misfire rate established during vehicle operation with a fuel not including fuel additives.

9. The method of claim 1, further comprising, indicating spark plug fouling due to accumulation of fuel additive by setting a diagnostic code, the diagnostic code requesting spark plug replacement and wherein indicating spark plug fouling due to accumulation of fuel additive includes indicating spark plug fouling is not due to accumulation of soot.

10. The method of claim 9, further comprising, receiving operator input regarding replacement of the spark plug, and in response to the operator input, resetting a monitor configured to count each of the change in adaptive knock term, the engine pre-ignition rate, engine misfire rate, and the engine exhaust catalyst switching frequency over a given vehicle drive cycle.

11. The method of claim 10, wherein the resetting is based on an age of the spark plug relative to an age of one or more other engine components including an exhaust oxygen sensor.

12. A method for an engine, comprising:
over a vehicle drive cycle, monitoring each of a plurality of parameters including a change in an adaptive knock term, an engine pre-ignition rate, an engine misfire rate, an exhaust catalyst degradation rate, and an exhaust oxygen sensor degradation rate; and
in response to two or more of the monitored parameters being higher than corresponding thresholds, indicating spark plug fouling due to fuel additive accumulation
in response to the indication of spark plug fouling due to accumulation of fuel additive, decreasing an engine load, and disabling fuel while maintaining spark ignition timing for the cylinder for a threshold duration, the threshold duration including a threshold number of combustion cycles.

13. The method of claim 12, wherein the exhaust catalyst degradation rate is based on one or more of a ratio of response times of exhaust oxygen sensors located upstream and downstream of an exhaust catalyst and a response time of one of the exhaust oxygen sensors located upstream of the exhaust catalyst.

14. The method of claim 12, further comprising, in response to only one of the monitored parameters being higher than the corresponding threshold, not indicating spark plug fouling due to fuel additive accumulation.

15. The method of claim 12, further comprising, in response to the indicating, decreasing an engine load, and disabling fuel to a cylinder coupled to the fouled spark plug for a number of combustion events.

16. The method of claim 15, wherein the cylinder is a first cylinder, the method further comprising, in response to the indicating, disabling fuel to a second cylinder not coupled to the fouled spark plug, the second cylinder configured to receive exhaust residuals from the first cylinder.

17. The method of claim 15, wherein the cylinder is a first cylinder, the method further comprising, in response to indicating, temporarily enriching a second cylinder not coupled to the fouled spark plug, the second cylinder configured to receive exhaust residuals from the first cylinder.

18. The method of claim 12, further comprising monitoring a control current of an ignition coil coupled to a spark plug and indicating spark plug fouling due to fuel additive accumulation in response to a switching time of the control current being above a threshold and further comprising indicating a severity of spark plug fouling due to fuel additives based on a number of the monitored parameters being higher than corresponding thresholds, the severity increasing with increasing number of monitored parameters higher than corresponding thresholds.

19. An engine system, comprising:
an engine including a cylinder;
an ignition system including an ignition coil and a control wire coupled to a spark plug of the cylinder; and
a controller with computer readable instructions on non-transitory memory for:
over a vehicle drive cycle, setting a diagnostic flag for each of a change in an adaptive knock term over a first threshold, an engine pre-ignition rate over a second threshold, an engine misfire rate over a third threshold, an exhaust catalyst degradation rate over a fourth threshold, and an exhaust oxygen sensor degradation rate over a fifth threshold;
during a first condition when two or more diagnostic flags are set, indicating fouling of the spark plug due to fuel additive accumulation; and
during a second condition when only one diagnostic flag is set, not indicating fouling of the spark plug due to fuel additive accumulation and initiating a spark plug cleaning routine;
in response to the indication of spark plug fouling due to accumulation of fuel additive, decreasing an engine load, and disabling fuel while maintaining spark ignition timing for the cylinder for a threshold duration, the threshold duration including a threshold number of combustion cycles.

\* \* \* \* \*